(12) United States Patent
Shae et al.

(10) Patent No.: US 11,816,681 B2
(45) Date of Patent: Nov. 14, 2023

(54) IMAGE AUTHENTICATION METHOD AND REAL-TIME PRODUCT AUTHENTICATION SYSTEM

(71) Applicant: Asia University, Taichung (TW)

(72) Inventors: Zon-Yin Shae, Taipei City (TW); Zhi-Ren Tsai, Taichung (TW); Jing-Pha Tsai, Taichung (TW)

(73) Assignee: Asia University, Taichung (TW)

( * ) Notice: Subject to any disclaimer, the term of this patent is extended or adjusted under 35 U.S.C. 154(b) by 455 days.

(21) Appl. No.: 17/247,974

(22) Filed: Jan. 4, 2021

(65) Prior Publication Data

US 2021/0397897 A1    Dec. 23, 2021

(30) Foreign Application Priority Data

Jun. 23, 2020   (TW) .................................. 109121359

(51) Int. Cl.
*G06Q 30/018* (2023.01)
*G06F 18/21* (2023.01)
*G06V 10/82* (2022.01)

(52) U.S. Cl.
CPC ......... *G06Q 30/018* (2013.01); *G06F 18/217* (2023.01); *G06F 18/2163* (2023.01); *G06V 10/82* (2022.01)

(58) Field of Classification Search
CPC .. G06Q 30/018; G06F 18/317; G06F 18/2163
See application file for complete search history.

(56) References Cited

U.S. PATENT DOCUMENTS

| 2019/0180143 A1* | 6/2019 | Lyu | ........................... G06T 1/20 |
| 2019/0362486 A1* | 11/2019 | Diao | ..................... G06V 10/758 |

FOREIGN PATENT DOCUMENTS

| CN | 107316289 | * | 3/2017 | ........... G06T 7/0012 |

* cited by examiner

*Primary Examiner* — Myron Wyche

(57) ABSTRACT

An image authentication method and a real-time product authentication system are provided. The method includes the following steps: inputting a training image in a training phase; segmenting the training image into a plurality of training sub-images; and training the deep learning model by using the plurality of training sub-images, wherein each of the plurality of training images includes a global feature property. The steps in the testing phase include: inputting a testing image and segmenting the testing image into a plurality of testing sub-images; performing a test on each of the plurality of testing sub-images and checking whether each of the plurality of testing sub-images is associated with one of the plurality of categories; and outputting an authentication result to identify whether the testing image is associated with one of the plurality of categories.

8 Claims, 10 Drawing Sheets

IMAGE AUTHENTICATION METHOD AND REAL-TIME PRODUCT AUTHENTICATION SYSTEM

CROSS-REFERENCE TO RELATED APPLICATION

This application claims priority to Taiwan Patent Application No. 109121359, filed on Jun. 23, 2020, in the Taiwan Intellectual Property Office, the content of which is hereby incorporated by reference in its entirety for all purposes.

BACKGROUND

1. Technical Field

The present disclosure relates to an image authentication method and a real-time product authentication system that applies the image authentication method, particularly to a method that utilizes a deep learning model to authenticate an image and a real-time authentication system that applies the method to authenticate the authenticity of a product.

2. Description of the Related Art

In modern society, as the number of members in each household decreases, consumers have been placing more and more emphasis on product quality due to the changing of consumption patterns. When producers sold fine agricultural products on the market in the past, it was extremely difficult for consumers to ensure that they could purchase the same products again due to a lack of identifiability.

The current method for identifying agricultural products is mainly based on the establishment of a traceable history system, which allows consumers to clearly know the information of producers and suppliers and to find high-quality agricultural products more easily on the market. In other words, the identifiability of a label of the traceable history is capable of helping producers and consumers communicate, further developing a sense of identity. In addition, the authentication method also provides third-party authentication and audit and traceability functions.

However, the aforementioned authentication method is very likely to be used by people with intentions. Since the label of the traceable history is commonly stuck on the outer packaging of agricultural products in a form of QR Code, it can be known in the art that people with intentions can falsify specific producing information and add the producing information to the QR Code. Consequently, there is no way for consumers to directly distinguish the authenticity of the products at the time of purchase.

In addition, the specific agricultural products, such as tea, rice, or coffee beans, can have different prices according to different levels. Since tea and rice with higher levels normally come with an extremely high price, such products are often targeted by people with intentions. The commonly used means can be replacing high-quality products with low-quality products or mix low-quality products into high-quality products in order to obtain illegal benefits. However, the appearance of these agricultural products is extremely similar. It is extremely difficult for people to distinguish the authenticity of the products circulating on the market except for producers themselves. This may result in significant costs or monetary losses to both producers and consumers.

Therefore, if there is a mechanism that allows consumers to effectively distinguish the authenticity of the products at the moment of unboxing, high-value agricultural products such as tea, rice, and coffee beans that are difficult to distinguish in particular, this may effectively improve product identification, foster consumer acceptance, increase product competitiveness, and enhance risk management and accountability.

Accordingly, the present disclosure has designed an image authentication method and a real-time product authentication system in an effort to tackle deficiencies in the prior art and further to enhance the implementation and application in industries.

SUMMARY

On the basis of the above objectives, the present disclosure provides an image authentication method used for a deep learning model built for a plurality of categories of a product. The method includes the following steps:

In a training phase, inputting a training image.

Segmenting the training image into a plurality of training sub-images.

Training the deep learning model by using the plurality of training sub-images, wherein each of the plurality of training images includes a global feature property.

The steps in the testing phase include: inputting a testing image and segmenting the testing image into a plurality of testing sub-images.

Performing a test on each of the plurality of testing sub-images and checking whether each of the plurality of testing sub-images is associated with one of the plurality of categories.

Outputting an authentication result to identify whether the testing image is associated with one of the plurality of categories.

Preferably, the training image is obtained by performing image capturing on the product which belongs to one of the plurality of categories.

Preferably, the product includes tea, coffee beans, or rice.

Preferably, a segmentation of the plurality of training sub-images is generated by defining a rectangular frame and moving the rectangular frame in the training image to capture images within the rectangular frame.

Preferably, at least two of the plurality of training sub-images are partially overlapped.

Preferably, the authentication result is generated through the deep learning model performing a voting strategy on each of the plurality of testing sub-images.

On the basis of the above objectives, the present disclosure further provides a real-time product authentication system, including an intelligence model, wherein the intelligence model is configured to realize the image authentication method as mentioned above.

Preferably, the real-time product authentication system of the present disclosure further includes a transaction identification barcode and an image uploader; wherein the transaction identification barcode is displayed or labeled on the product, the transaction identification barcode is embedded in a network link and a transaction code of the product, and the image uploader is provided for a user to upload a to-be-authenticated image and sent to the intelligence model to generate the authentication result; wherein the image uploader is located on a webpage opened via the network link, and the transaction code includes one of a plurality of quality parameters defining quality of the product and an intelligence model index value defining a corresponding deep learning model of the product.

Preferably, the real-time product authentication system of the present disclosure further includes a database and a processing application, wherein the database stores a final product image corresponding to the transaction code, and the processing application inputs the final product image to the intelligence model as the training image which is configured to authenticate the authentication result of the to-be-authenticated image.

Preferably, the real-time product authentication system of the present disclosure further includes a blockchain, wherein the blockchain is configured to store and manage a plurality of quality parameters of the product and the intelligence model, and the plurality of quality parameters form a traceable history of the product. Moreover, the blockchain includes the intelligence model index value indicating the intelligence model through the transaction code and embeds the transaction code into the transaction identification barcode.

Accordingly, it can be known that the image authentication method provided by the present disclosure may be applied to an artificial intelligence model. The present disclosure may be configured to detect an image with a hidden global feature property, such as tea leaves, rice, or coffee beans. In contrast, the prior art may merely detect an image with local features, such as faces, sandwiches, or furniture. Furthermore, the present disclosure further provides a real-time product authentication system that applies the image authentication method, which may provide consumers with a fast and convenient product authentication mechanism to assist consumers in authenticating the authenticity of the products they purchase. Thus, the risk of mixing or replacing products with materials with poor quality on the sale end may be completely avoided, providing great protection for both producers and consumers.

In addition, the image authentication method provided by the present disclosure may detect whether a to-be-authenticated image by the user input is an image with a hidden global feature property. The technical feature may be further configured to authenticate whether the to-be-authenticated image has been retouched or not, which may help fight against fake news or illegal activities such as manual picture alteration.

DESCRIPTION OF THE PREFERRED EMBODIMENTS

To illustrate the technical characteristics, contents, advantages, and achievable effects of the present disclosure, the embodiments together with the drawings are described in detail as follows. However, the drawings are used only for the purpose of indicating and supporting the specification, which is not necessarily the real proportion and precise configuration after the implementation of the present disclosure. Therefore, the relations of the proportion and configuration of the attached drawings should not be interpreted to limit the actual scope of implementation of the present disclosure.

The advantages, features, and technical methods of the present disclosure are to be explained in detail with reference to the exemplary embodiments and the drawings for a better understanding of the present disclosure. Moreover, the present disclosure may be realized in different forms, and should not be construed as being limited to the embodiments set forth herein. Conversely, for a person of ordinary skill in the art, the embodiments provided shall make the present disclosure convey the scope more thoroughly, comprehensively, and completely. In addition, the present disclosure shall be defined only by the appended claims.

Figure 1:
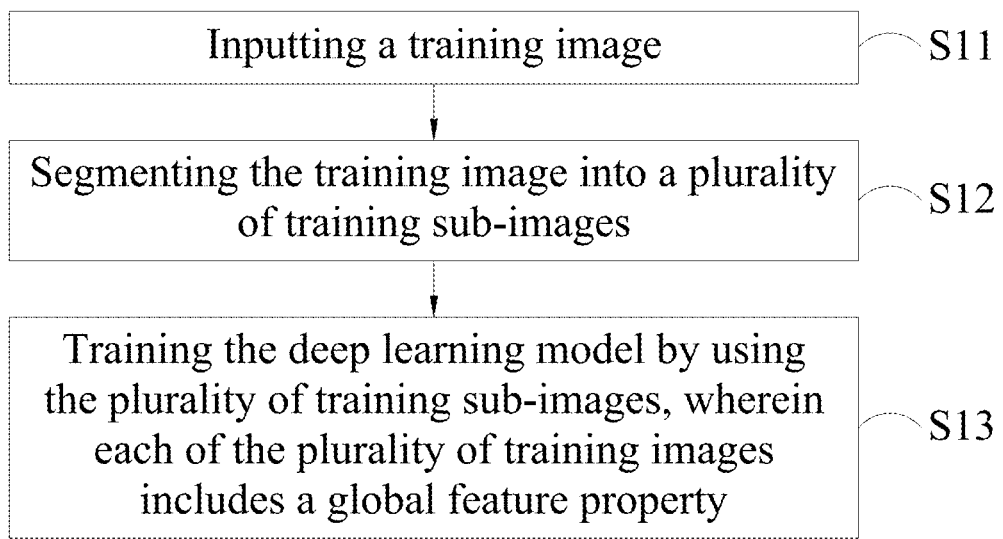
FIG. 1 is a first flowchart of the image authentication method according to the present disclosure.
Figure 2:
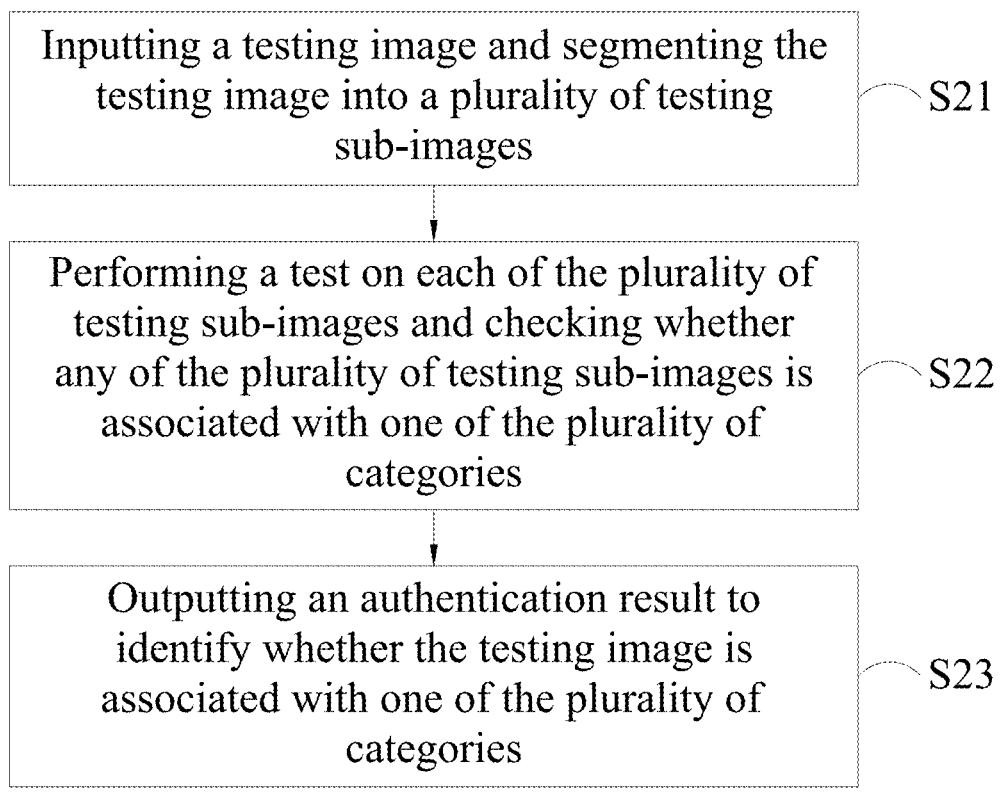
FIG. 2 is a second flowchart of the image authentication method according to the present disclosure.

Refer to FIG. 1 and FIG. 2, which are the first flowchart and the second flowchart of the image authentication method of the present disclosure. As shown in the figure, the image authentication method provided by the present disclosure may be an algorithm implemented in program code, and the image authentication method is applicable to a deep learning model built for a plurality of categories of a product. With the image authentication method, the deep learning model may detect whether an input image belongs to or is associated with one of the plurality of categories of the product, wherein the image is generated by performing image capturing on the actual product, which is configured to authenticate the authenticity of the actual product.

Specifically, the image authentication method of the present disclosure includes two phases: a training phase and a testing phase, which are respectively shown in FIG. 1 and FIG. 2, wherein the training phase includes the flowing steps.

Step S11: inputting a training image. The source of the training image comes from performing image capturing on the product which belongs to one of the plurality of categories. For instance, when the product is coffee beans, the category thereof may include three types, namely *Arabica* coffee beans, *Robusta* coffee beans, and *Liberica* coffee beans. Thus, the training image requires performing image capturing on the three types of coffee beans in order to be inputted to the deep learning model for training.

Step S12: segmenting the training image into a plurality of training sub-images.

Step S13: training the deep learning model by using the plurality of training sub-images, wherein each of the plurality of training images includes a global feature property.

In Step S12, the segmentation of the plurality of training sub-images is generated by defining a rectangular frame and moving the rectangular frame in the training image to capture images within the rectangular frame. Furthermore, the size of each training sub-image may be a ratio of 1/20 to 1/100 of the size of the training image. The training image may be captured in a way that it is centered on a training sub-image and gradually moved in a fixed horizontal or vertical direction. That is, the size of the moving rectangular frame is the size of the training sub-image. However, in the present embodiment, the movement of the training sub-image is not limited to the aforementioned direction, and the movement may also be generated by randomly capturing images in the training image. The number of training sub-images segmented from the training image may range from hundreds to thousands.

It should be noted that the products in the present disclosure may include agricultural products, such as tea, coffee beans, or rice. The common feature of these agricultural products is that they do not have obvious local features to be identified. Specifically, the local features refer to the identification basis of an object, such as eyes, ears, nose, etc., in face identification. General face identification methods may be configured to identify individual faces based thereon. In contrast to the local features, the products covered in the present disclosure merely have a very similar appearance, color, and shape. The applicant refers to the similar appearance and shape of such products as "a global feature property". Each of the segmented training sub-images includes more than one unit of the product. Thus, each training sub-image should also have this global feature property. The present disclosure authenticates the images containing such products according to the discovery.

However, in a preferred embodiment, in these training sub-images, at least two of the training sub-images are partially overlapped, and the training data of the overlapping part of the images may help the deep learning model to authenticate the correctness of the images to be tested in the testing phase.

The steps in the testing phase of the deep learning model include:

Step S21: inputting a testing image and segmenting the testing image into a plurality of testing sub-images, wherein a testing image may be a photograph of a product to be tested, and this testing image may be segmented in the same way as the training sub-images.

Step S22: performing a test on each of the plurality of testing sub-images and checking whether each of the plurality of testing sub-images is associated with one of the plurality of categories.

Step S23: outputting an authentication result to identify whether the testing image is associated with one of the plurality of categories.

In a preferred embodiment, the test performed in Step S22 may include a voting strategy. In this phase, the deep learning model may vote on each testing sub-image to determine whether it is associated with one of the defined plurality of categories, and the generated final authentication result may be the voting result.

Different from the prior art, in the testing phase, the present disclosure segments the testing image into a plurality of testing sub-images and identifies each of the testing sub-images. The segmentation method for the testing sub-images in the present embodiment is the same as that for the training sub-images. However, the present disclosure is not limited thereto, and the images may also be segmented into independent sub-images for testing operations.

If the image of the product captured in the testing image is different from the category predefined by the deep learning model, it may be expected that the voting result of each testing sub-image may be rejected. In general, the voting result of the present disclosure may be determined by the majority but is not limited thereto. The present disclosure may also use a user-defined higher threshold to determine whether the authentication is passed. When the threshold value is set higher, the authentication result is more accurate.

Another embodiment is configured to explain the image authentication method of the present disclosure. Table 1 shows the six tea categories predefined in the deep learning model of the present disclosure, which are from Class 0 to Class 5, including different tea leaves from Hehuanshan, Zhushan, and Alishan. It should be noted that the appearance and shape of the tea leaves grown on different sunward sides in the Hehuanshan are slightly different due to environmental factors, such as sunshine and wind direction, resulting in the aroma of the tea leaves also being different. General consumers may only rely on the description of the outer packaging to identify the categories of tea purchased. Compared to conventional techniques, the present embodiment identifies categories of the tea leaves after opening according to the aforementioned image authentication method.

TABLE 1

| Categories of tea leaves | | | |
|---|---|---|---|
| Index | Species | Place of origin | Note |
| Class 0 | To be confirmed | Nantou County - Hehuanshan | Sunward side - North |
| Class 1 | To be confirmed | Nantou County - Hehuanshan | Sunward side - East |
| Class 2 | To be confirmed | Nantou County - Hehuanshan | Sunward side - Southwest |
| Class 3 | Taiwan Tea No. 12 | Nantou County - Jhushan | |
| Class 4 | To be confirmed | Chiayi County - Alishan | |
| Class 5 | Chin-Shin-Oolong | Nantou County - Jhushan | |

Figure 3:
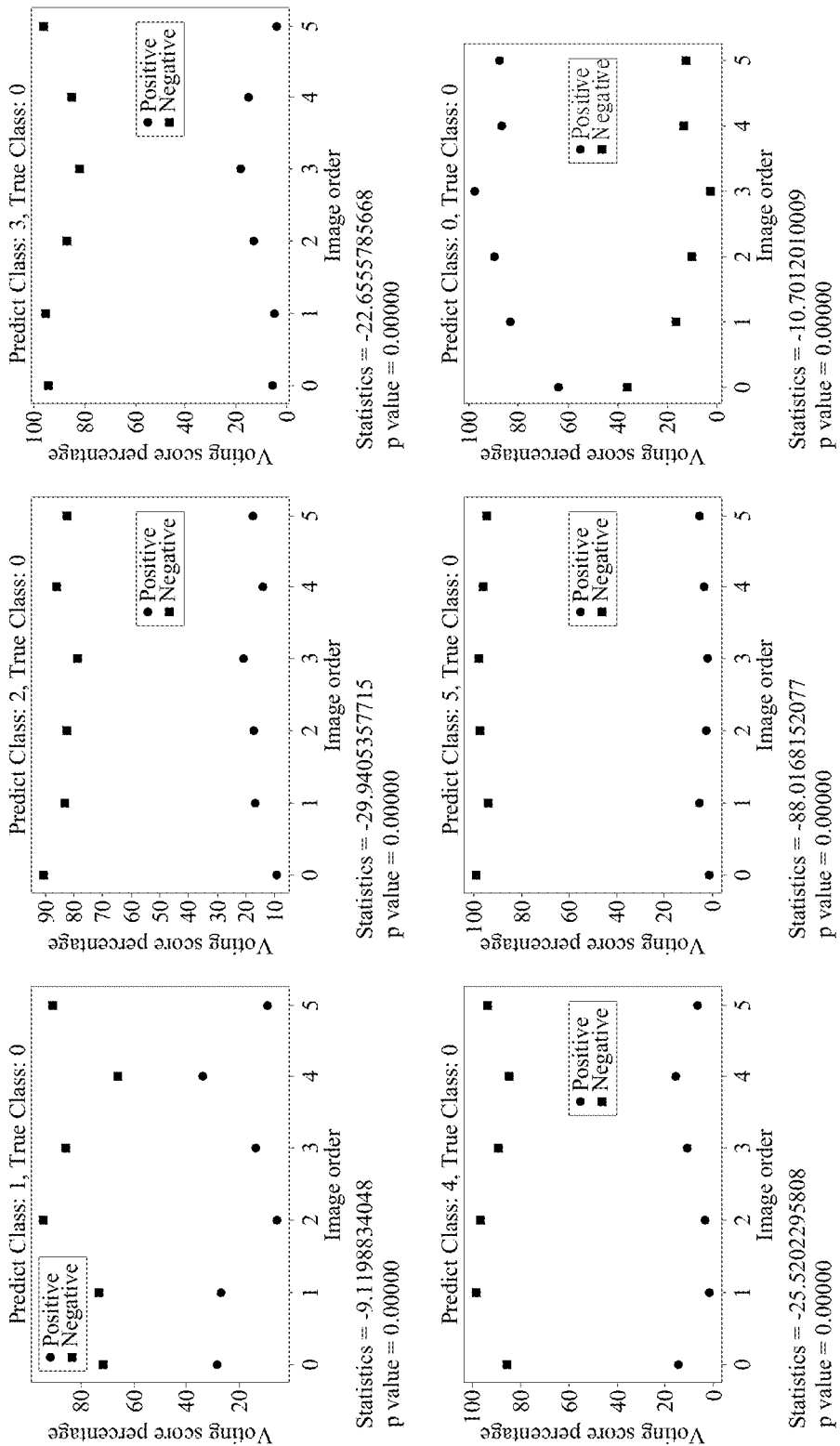
FIG. 3 is a schematic diagram of the authentication result of the image authentication method according to the present disclosure.

The image authentication method of the present disclosure inputs the photos of the six types of tea leaves into the deep learning model for the deep learning model to operate, wherein the learning content may be referred to Steps S11 to S13 in the aforementioned embodiment. However, if a consumer orders a batch of tea products that are claimed to be Class 0, the consumer simply captures an image of the tea leaves after opening and inputs the image into the deep learning model in the testing phase for testing. FIG. 3 shows the authentication result of inputting the image into the deep learning model in the present embodiment, wherein True Class is a category model of No. 0 predefined in the deep learning model, Predict Class is a category of the testing image actually inputted by consumers, and Voting Score Percentage represents the ratio of the number of testing sub-images segmented from the testing image, and Image Order represents the number of testing images. In present embodiment, six testing images per class are used as an example.

It can be seen from the figure that among Predict Class 1 to 5, the voting result of each testing sub-image has a negative ratio greater than a positive ratio. This represents that the global feature property included in each testing sub-image is different from that in the category of No. 0 predefined in the deep learning model. In the data of Predict Class 0, the voting result of the six testing images is that the positive ratio is greater than the negative ratio, meaning that the global feature property included in each testing sub-image is mostly the same as that of Class 0. Consumers purchasing the tea leaves of Class 0 are taken as an example. Lastly, from the authentication result, the consumer may understand that the tea product purchased is indeed the category of Class 0.

Specifically, the image authentication method of the present disclosure may be configured to detect whether the original image has been modified. The present disclosure segments the testing image into a plurality of testing sub-images in the testing phase and votes for each testing sub-image to determine whether the testing sub-image includes a global feature property. It may be understood that if only a few testing sub-images do not include the global feature property in the testing image, that is, if the negative ratio of these testing sub-images is greater than the positive ratio, these testing sub-images may not be the content of the original image, meaning that the original image has been modified by a person with intention. Thus, it is possible to prevent the use of fake news or picture alteration for illegal profit in advance.

Figure 4:
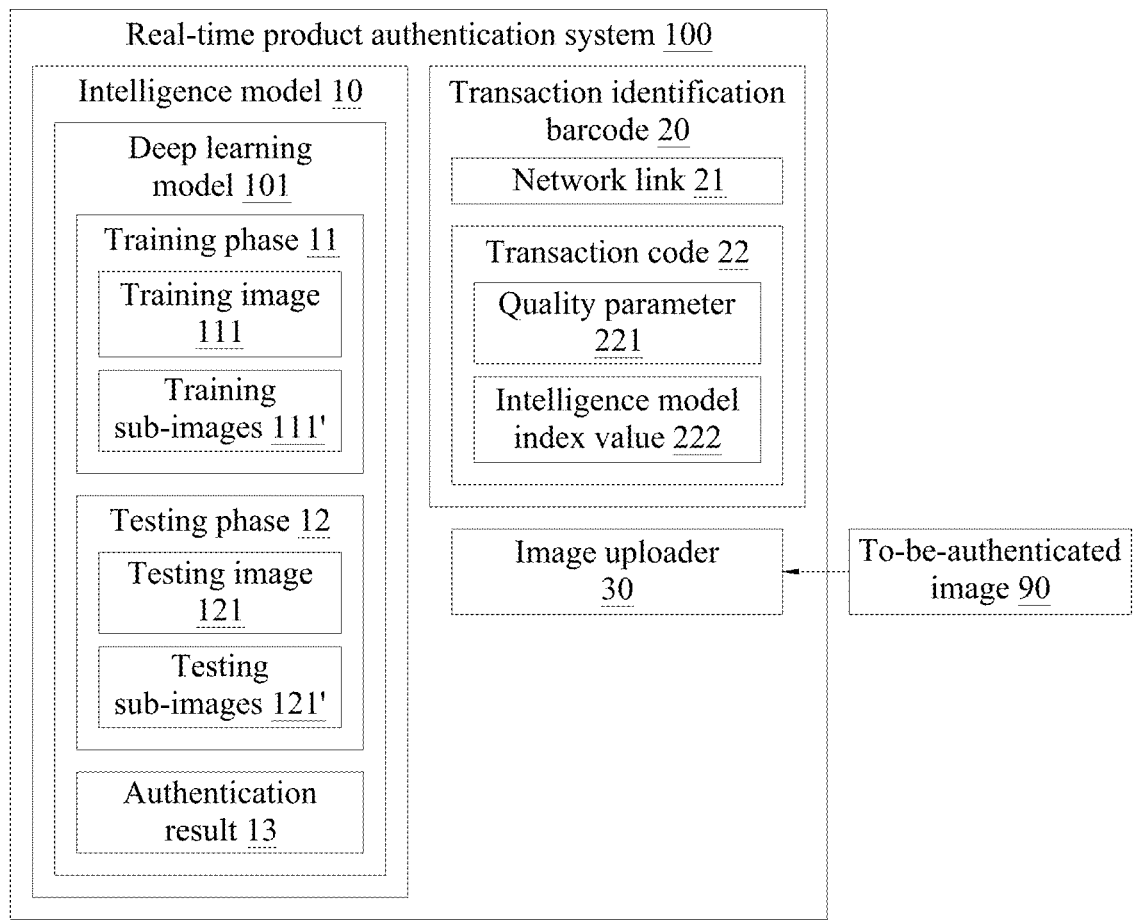
FIG. 4 is a block diagram of the real-time product authentication system according to the present disclosure.

Refer to FIG. 4, which is a block diagram of the real-time product authentication system according to the present disclosure. As shown in the figure, the real-time product authentication system 100 of the present disclosure includes an intelligence model 10, a transaction identification barcode 20, and an image uploader 30. Both the intelligence model 10 and the image uploader 30 may be software applications, and the intelligence model 10 has a deep learning model 101. The deep learning model 101 adopts the image authentication method provided by the present disclosure and the content thereof includes a training phase 11 and a testing phase 12. In the training phase 11, the user inputs a training image 111 and segments it into a plurality of training sub-images 111'. In the testing phase 12, the user inputs a testing image 121 and segment a plurality of testing sub-images 121'. Lastly, an authentication result 13 of the testing image 121 is generated, wherein the content of the image authentication method has been described in the aforementioned embodiment, the description of which shall be omitted herein.

In the present embodiment, the image uploader 30 allows the user to upload a to-be-authenticated image 90 to a computer or server that includes the intelligence model 10. In a preferred situation, the image uploader 30 and the intelligence model 10 may coexist in the same system host, without being limited thereto.

The transaction identification barcode 20 of the present embodiment may be labeled on the packaging of the product A, and a network link 21 and a transaction code 22 of the product A may be embedded on the transaction identification barcode 20, wherein the transaction code 22 includes an intelligence model index value 222 searching for the search product A in addition to including a plurality of quality parameters 221 defining quality of the product A. Specifically, the quality parameter 221 includes at least one recorded image of the product A at different manufacturing points in the production and sale process, including appearance, type, and description, etc. In the present disclosure, the recorded image of one of the quality parameters 221 may be captured as the training image 111 of the image authentication method, thus being able to train the deep learning model 101 of the present disclosure.

In a preferred situation, the transaction identification barcode 20 may be implemented as a QR code, and the image uploader 30 is located on a webpage opened via the network link 21. The user only needs to scan the transaction identification barcode 20 by using a mobile device and may be directly directed to the webpage of the image uploader 30. While the webpage is being opened, the intelligence model index value 222 of the transaction identification barcode 20 is also sent to the intelligence model 10. Furthermore, the intelligence model 10 searches for and selects the deep learning model 101 related to the category of the product A according to the intelligence model index value 222 for the follow-up image authentication. The user then only needs to provide the to-be-authenticated image 90, which may be sent to the testing phase 12 of the intelligence model 10 as the testing image 121 in the testing phase 12, further generating the authentication result 13.

Figure 5:
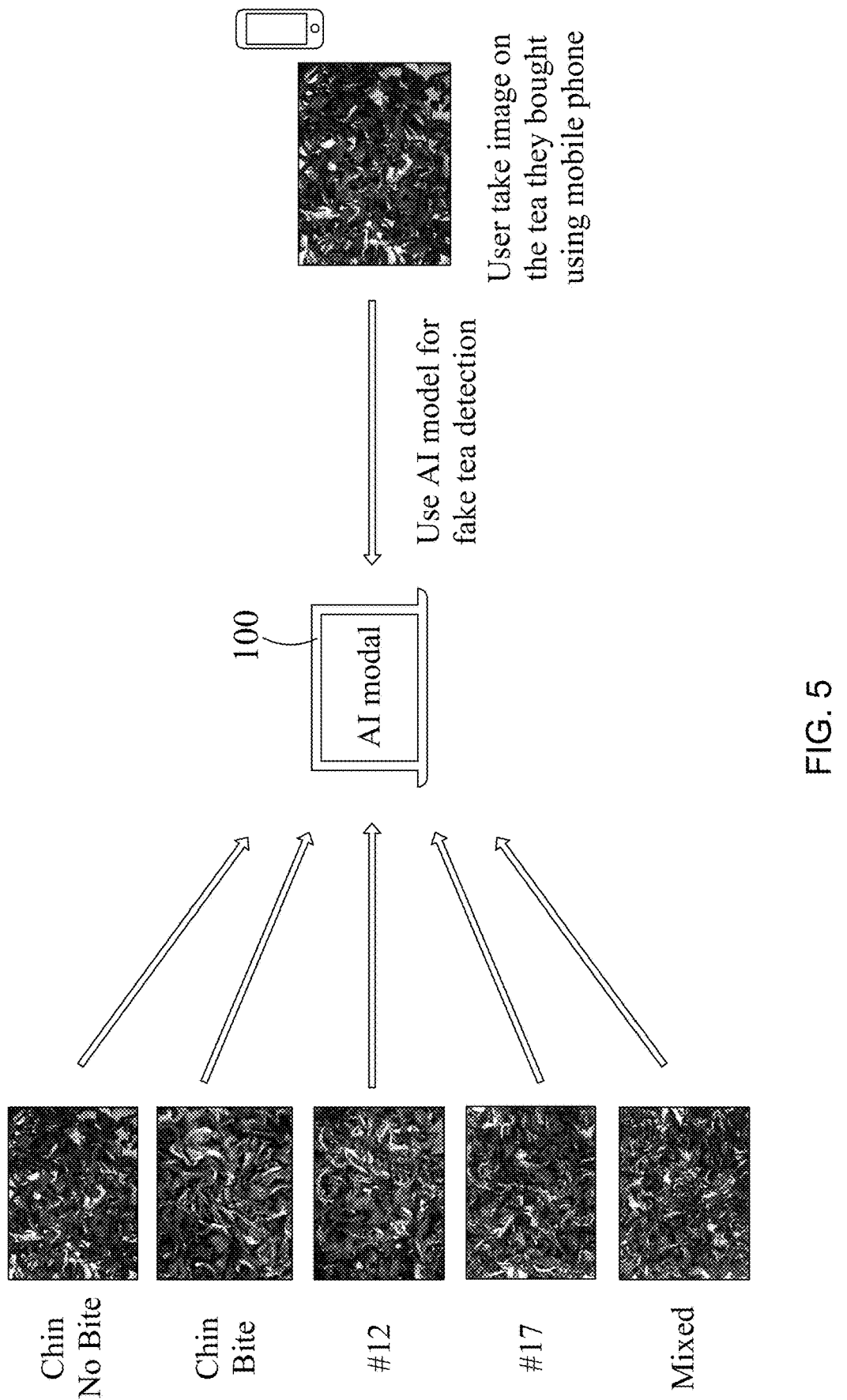
FIG. 5 is a schematic diagram of the real-time product authentication system according to the present disclosure.

Refer to FIG. 5, which is a schematic diagram of the real-time product authentication system according to the present disclosure, along with reference to FIG. 4. In the present embodiment, a tea product is used as an example to illustrate the real-time authentication mechanism of the present disclosure. At first, the user may regard a variety of different tea products as predefined categories (for example, five categories in the present embodiment) and input the images of the five tea products into the real-time product authentication system 100. Furthermore, through the aforementioned image authentication method, the training and learning of the deep learning model 101 in the real-time product authentication system 100 may be completed.

When the user purchases a related tea product, the user only needs to capture the image of the tea product through a smartphone and then upload the image to the real-time product authentication system 100. Through the image authentication method designed for the present disclosure, the authenticity of the tea products purchased may be authenticated in real-time instead of blindly identifying the product from the outside packaging.

Figure 6:
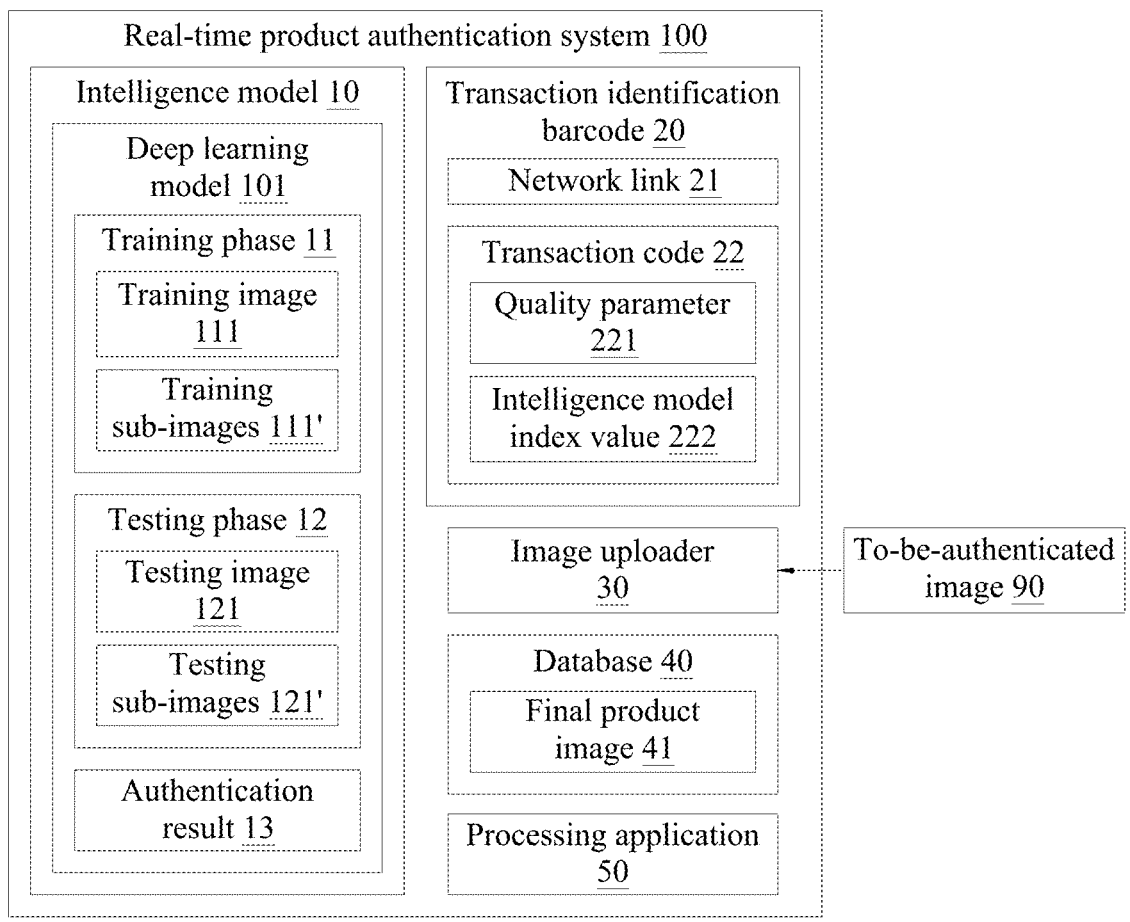
FIG. 6 is a block diagram of the real-time product authentication system according to another embodiment of the present disclosure.

Refer to FIG. 6, which is a block diagram of the real-time product authentication system according to another embodiment of the present disclosure, along with reference to FIG. 4. In the present embodiment, the product real-time product authentication system 100 includes an intelligence model 10, a transaction identification barcode 20, an image uploader 30, a database 40, and a processing application 50, wherein the technical features of the intelligence model 10, the transaction identification barcode 20, and the image uploader 30 are the same as those described in the aforementioned embodiment, the description of which shall be omitted herein.

In the present embodiment, the database 40 may be a database management system, such as Access, Oracle Database, SQL Server, etc., and the processing application 50 may be a software application. As described in the aforementioned embodiment, the transaction code 22 includes a plurality of quality parameters 221 of defining quality of a product A and an intelligence model index value 222 defining a corresponding deep learning model 101 of the product A. Specifically, the quality parameter 221 may include related images, types, and descriptions of the product A, and the intelligence model index value 222 is the deep learning model 101 corresponding to the category of the product A. In a preferred situation, the database 40 in the present embodiment may be configured to store the quality parameter corresponding to the last entry in the transaction code 22, which normally is the final product image 41 (i.e., the image of the product before packaging) of the product A.

Furthermore, the processing application 50 inputs the final product image 41 into the intelligence model 10 as a training image 111 in the deep learning model 101 and is configured to authenticate the authentication result 13 of the to-be-authenticated image 90.

Figure 7:
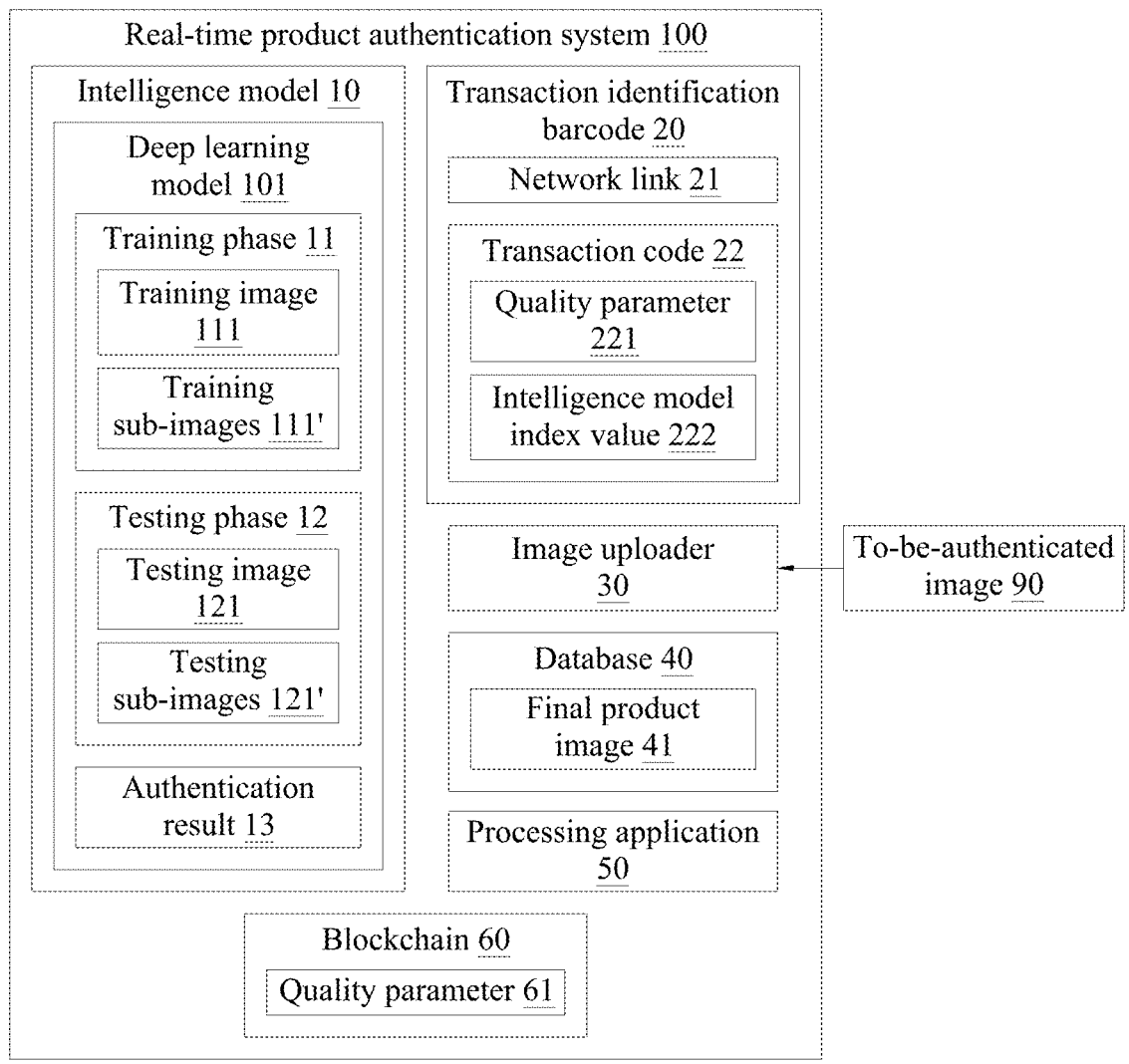
FIG. 7 is a block diagram of the real-time product authentication system according to the second embodiment of the present disclosure.

Refer to FIG. 7, which is a block diagram of the real-time product authentication system according to another embodiment of the present disclosure, along with reference to FIG. 6. In the present embodiment, the technical features of the intelligence model 10, the transaction identification barcode 20, the image uploader 30, the database 40, and the processing module 50 included in the real-time product authentication system 100 are the same as those described in the aforementioned embodiment, the description of which shall be omitted herein.

In contrast to the aforementioned embodiment, the present embodiment further includes a blockchain 60 for a product A. In the traceable history from production, delivery, manufacturing, inspection, packaging to sales, the user at each point may generate the quality parameter 61 of the product A (i.e., the image, production and sale information, and related introduction of the product A) and upload the quality parameter 61 to the blockchain 60 such that a traceable history of the product A exists in a blockchain. If a consumer is interested in the traceable history of the product A, the consumer may scan the transaction identification barcode 20 to further know the relevant information. Please refer to the following embodiment for descriptions.

Figure 8:
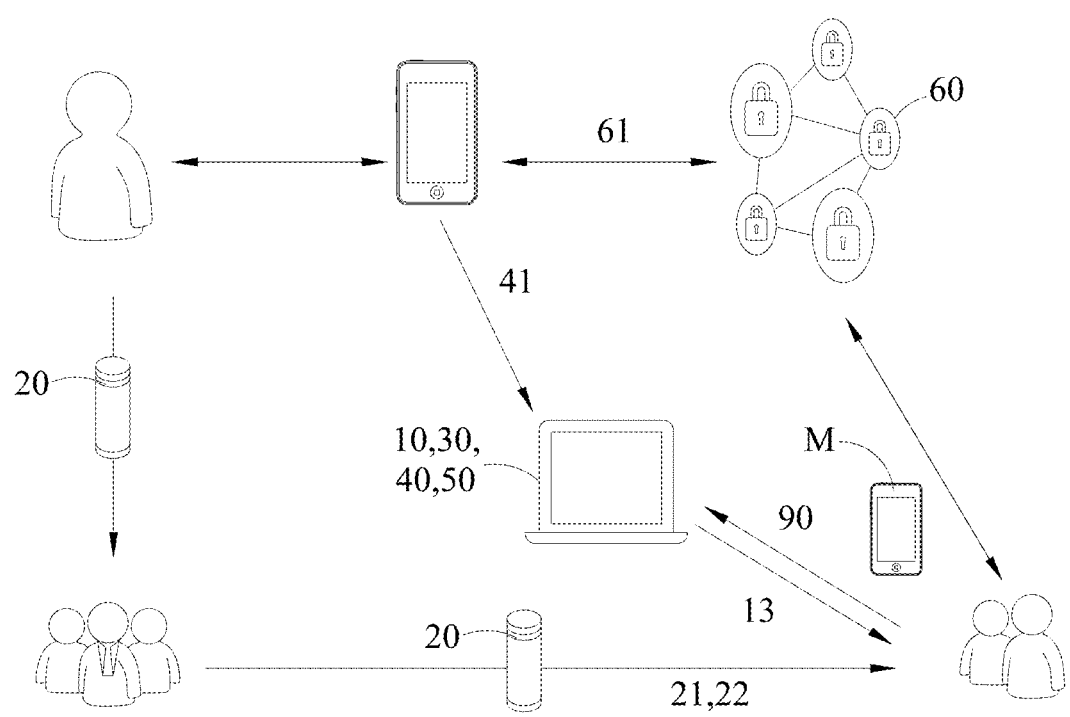
FIG. 8 is a schematic diagram of the real-time product authentication system according to the second embodiment of the present disclosure.

Refer to FIG. 8, which is a schematic diagram of the real-time product authentication system according to the second embodiment of the present disclosure. In the present embodiment, a tea product is used as the subject of real-time product authentication. On one hand, before the tea product is recovered and packaged by a producer (i.e., a farmer), the producer uses an image-capturing device (such as a smartphone) to captures images of the tea product to generate related quality parameter 61, which is then uploaded to the blockchain of the present disclosure. In the meantime, a final product image 41 in the quality parameter 61 is uploaded to the database 40 through the image uploader 30 to train the final product image 41 in the deep learning model 101 in advance.

On the other hand, the producer generates a transaction identification barcode 20 including a network link 21 and a transaction code 22, and attaches the transaction identification barcode 20 to the packaging of the tea product. Through sales distribution channels and merchants, a consumer makes a purchase for the tea product in the end. The transaction code 22 not only includes the quality parameter 221 of the tea product but also includes the intelligence model index value 222 for searching for the tea product on the database 40 and the blockchain 60.

In the meantime, the consumer may scan the transaction barcode 20 on the tea product packaging (e.g., tea can) by using the smartphone M. Specifically, the network link 21 may guide the web browser of the smartphone M to automatically open a webpage, while the transaction code 22 in the transaction identification barcode 20 may also be sent to the processing application 50. The processing application 50 may look up all the quality parameters 61 of the tea product stored on the blockchain 60 according to the transaction code 22 to further form a traceable history of one of the tea products. Moreover, traceable history is displayed on the opened webpage. Thus, a user may clearly understand the production and sale process of the tea product.

On the other hand, when the user is inclined to check whether the tea purchased is genuine, the user may captures images of the tea leaves after opening to further generate a to-be-authenticated image 90. Furthermore, the to-be-authenticated image 90 is then uploaded to the intelligence model 10 through the image uploader 30. In a preferred situation, the image uploader 30 may exist in the webpage opened via the network link 21.

It should be noted that the blockchain 60 of the present disclosure may be configured to not only store the quality parameter 61 of the product but also store different intelligence models 10. After the user scans the transaction code 22, the intelligence model index value 222 included in the transaction code 22 may point out the location of the intelligence model 10 of the product stored on the blockchain 60 such that the user may accurately find out the intelligence model 10 related to the product when the user uploads the to-be-authenticated image 90 to the image uploader 30.

Through the deep learning model 101 of the intelligence model 10, the to-be-authenticated image 90 is regarded as a testing image 121 and segmented into a plurality of testing sub-images 121' for testing, wherein the testing method has been described in the image authentication method of the present disclosure, the description of which shall be omitted herein. The authentication result 13 may be determined by a voting mechanism in the image authentication method. Lastly, the authentication result 13 is sent back to the user's smartphone M. The characteristics of authenticating the authenticity of a product in real-time are achieved by the authentication method.

Accordingly, the image authentication method provided by the present disclosure may be applied to a deep learning model, which may be utilized to detect an image with a hidden global feature property, such as images of tea, rice, or coffee beans. Based on the image authentication method, the present disclosure further provides a real-time product authentication system, which may provide a consumer with a fast and convenient product certification mechanism such that the user may check the authenticity of the product through a smartphone. Thus, the risk of mixing or replacing products with materials with poor quality on the sale end may be completely avoided, providing great protection for both producers and consumers.

When the consumer is inclined to further understand more about the product, the real-time product authentication system provided by the present disclosure also provides the function of viewing related traceable history and utilizes the technical features of security of the blockchain, thus effectively storing and managing the content of the traceable history of the product to be viewed. Furthermore, the blockchain is utilized to store and manage the intelligence model of the present disclosure, largely reducing the possibility of intrusion or cracking of the real-time product authentication system of the product.

In addition to using the global feature property to authenticate the authenticity of an image, the technical features of the image authentication method provided by the present disclosure may also be configured to further detect whether the image has been modified or altered. In the event of picture alteration, the segmented testing sub-images may be tested for the result that does not match the global feature property. The user may easily know the modified positions on the image, which may help fight against fake news or illegal activities such as manual picture alteration.

Physical properties of tea images have been demonstrated to be present. However, the tea images do have a homogeneous style of property, that is, the entire image looks similar. In a general image, e.g., all the images in the database 40, the homogeneous style does not exist. For any given image, it is questionable that the physical property exists. It is assumed that a physical property of any given image taken by a camera does exist. This assumption is based on the fact that when each image is captured by a camera, at that instance, there are many unique physical properties in the environment, e.g., the camera used, the person taken the picture, the lighting, the aperture, the perspective, the time, atmosphere, content, etc. The assumption is that the captured image should include some kinds of unknown representation of these unique physical environment parameters into an image.

Figure 9:
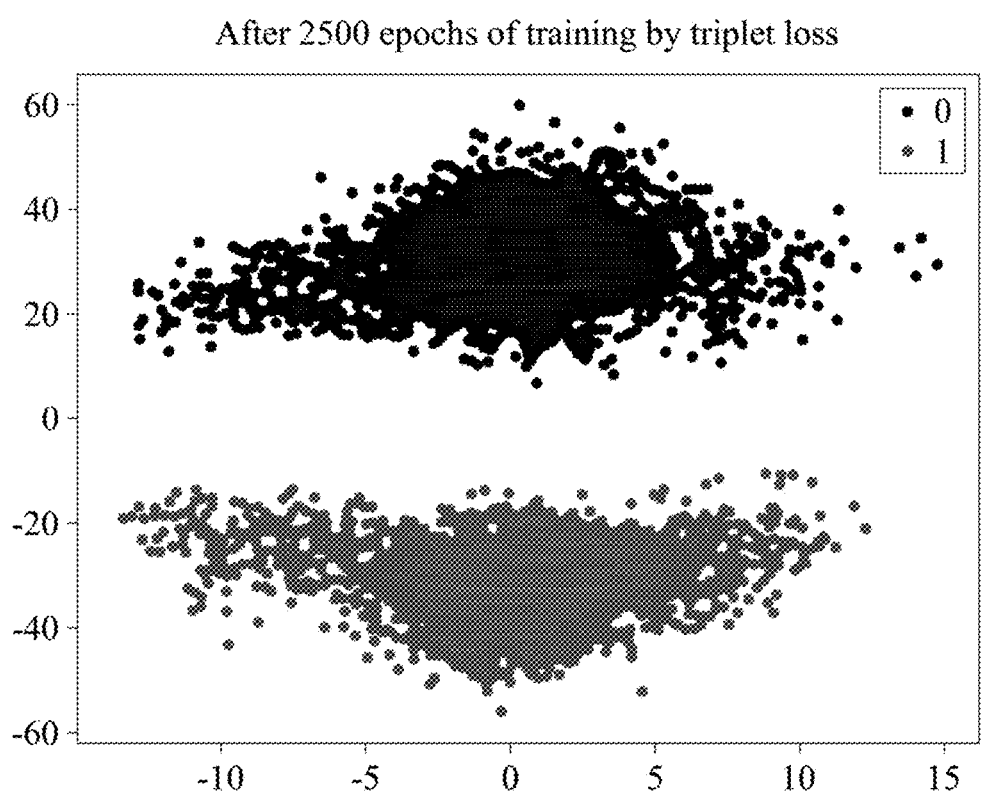
FIG. 9 is a graph of the triplet result visualization for a given image according to the present disclosure.

Refer to FIG. 9, which is a graph of the triplet result visualization for a given image according to the present disclosure. An initial experiment has been designed to explore this assumption. If the physical property does exist in an image, this should be a global feature property, that is, if the image is divided into many sub-images, then this physical feature property should be identical to all the divided sub-images. A picture is randomly selected from the 100 pictures taken by a camera, which is resized as a dimension of 900×900×3 for easier sampling. By applying a fixed 9 pixels shifting steps and sampling out 7921×2 sub-images, each sub-image is in a dimension of 100×100×3. These sub-images are then randomly divided into two equal data sets, each of which includes 7921 sub-images. These two groups are labeled with 0 and 1, and a deep learning model 101 is trained with 128 bits of feature vector to separate these two groups of sub-images. If the physical property exists, then these two groups of sub-images should be easily separated in two self-concentrated clusters by the deep learning model 101 with triplet loss mechanism. In order to visualize degree of clustering, the 128 bits of feature vector is projected onto two dimensions using PCA (Principle Component Analysis). The projection results can be visualized as the following two self-concentrated clusters shown in FIG. 9.

Figure 10:
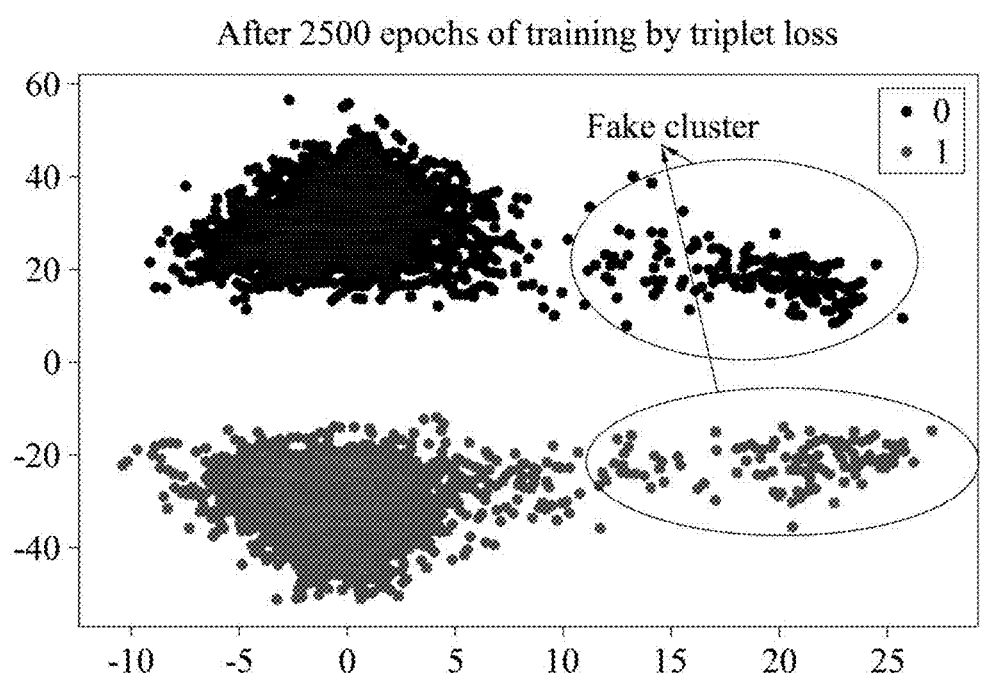
FIG. 10 is a graph of the triplet result visualization for mixed images according to the present disclosure.

Refer to FIG. 10, which is a graph of the triplet result visualization for mixed images according to the present disclosure. The triplet deep learning model 101 is applied in this experiment since this technology is powerful to isolate one cluster from the rest. In a triplet deep learning, it requires triple training data images A (Anchor), P (Positive), N (Negative) for a given training label. For a given image A which is selected from one of the two labeled sub-groups, one image P is randomly selected from the same sub-group of image A, and another image N is randomly selected from the other sub-group. After 2500 training epochs, the loss is around 0.013, which is rather small. The PCA projection into two dimensions for visualization is shown in FIG. 9. It is shown that the two clusters are clearly separated in large distance. The same process is carried out, with the addition of 20 sub-images generated from the $2^{nd}$ image evenly into the two sub-groups. Effectively, this is to mix a very small amount of the $2^{nd}$ image physical property into the first image physical property. The trained result is shown in FIG. 10, which shows some noise points starting to appear. This indicates there are two physical properties involved.

The embodiments as described above are only explanations of the technical ideas and features of the present disclosure. The purpose is to enable those skilled in the art to understand the contents in the present disclosure and put the contents into practice. It is apparent that the claims of the present disclosure cannot be confined by the contents. That is, the scopes of the equivalent variations or modifications made by the spirit disclosed by the present disclosure should still be included in the claims of the present disclosure.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

What is claimed is:

1. A real-time product authentication system, comprising an intelligence model, wherein the intelligence model is configured to realize an image authentication method used for a deep learning model built for a plurality of categories of a product, the image authentication method comprising:
   a training phase, comprising:
   inputting a training image;
   segmenting the training image into a plurality of training sub-images; and
   training the deep learning model by using the plurality of training sub-images, wherein each of the plurality of training images includes a global feature property; and
   a testing phase, comprising:
   inputting a testing image and segmenting the testing image into a plurality of testing sub-images;
   performing a test on each of the plurality of testing sub-images and checking whether any of the plurality of testing sub-images is associated with one of the plurality of categories; and
   outputting an authentication result to identify whether the testing image is associated with one of the plurality of categories,
   the real-time product authentication system further comprising a transaction identification barcode and an image uploader; wherein the transaction identification barcode is displayed or labeled on the product, the transaction identification barcode is embedded in a network link and a transaction code of the product, and the image uploader is provided for a user to upload a to-be-authenticated image and sent to the intelligence model to generate the authentication result; wherein the image uploader is located on a webpage opened via the network link, and the transaction code comprises one of a plurality of quality parameters defining quality of the product and an intelligence model index value defining a corresponding deep learning model of the product.

2. The real-time product authentication system according to claim 1, further comprising a database and a processing application, wherein the database stores a final product image corresponding to the transaction code, and the processing application inputs the final product image to the intelligence model as the training image which is configured to authenticate the authentication result of the to-be-authenticated image.

3. The real-time product authentication system according to claim 2, further comprising a blockchain, wherein the blockchain is configured to store and manage a plurality of quality parameters of the product and the intelligence model, and the plurality of quality parameters form a traceable history of the product.

4. The real-time product authentication system according to claim 1, wherein the training image is obtained by performing image capturing on the product which belongs to one of the plurality of categories.

5. The real-time product authentication system according to claim 1, wherein the product comprises tea, coffee beans, or rice.

6. The real-time product authentication system according to claim 1, wherein a segmentation of the plurality of training sub-images is generated by defining a rectangular frame and moving the rectangular frame in the training image to capture images within the rectangular frame.

7. The real-time product authentication system according to claim 6, wherein at least two of the plurality of training sub-images are partially overlapped.

8. The real-time product authentication system according to claim 1, wherein the authentication result is generated through the deep learning model performing a voting strategy on each of the plurality of testing sub-images.

* * * * *